Figure 1:
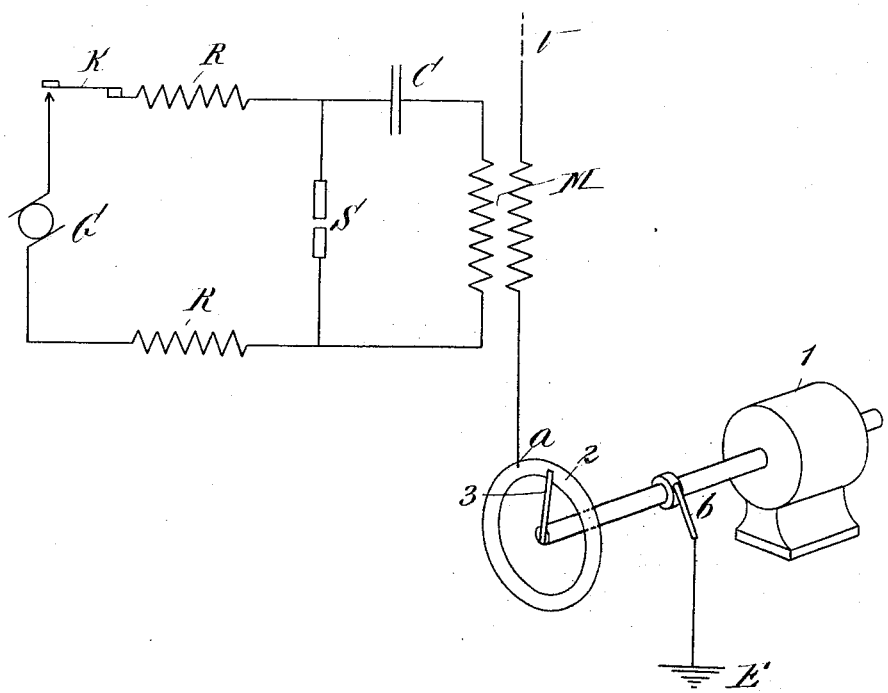

L. DE FOREST.
SPACE TELEGRAPHY.
APPLICATION FILED JUNE 25, 1907.

913,718.

Patented Mar. 2, 1909.
2 SHEETS—SHEET 1.

WITNESSES:
Patrick L. _____
E. B. Tomlinson

INVENTOR:
Lee de Forest
by Geo. K. Woodworth
Atty.

L. DE FOREST.
SPACE TELEGRAPHY.
APPLICATION FILED JUNE 25, 1907.

913,718.

Patented Mar. 2, 1909.

2 SHEETS—SHEET 2.

WITNESSES:
Patricia L Lowry
E. B. Tomlinson.

INVENTOR:
Lee de Forest
by Geo. K. Woodworth
Atty.

UNITED STATES PATENT OFFICE.

LEE DE FOREST, OF NEW YORK, N. Y., ASSIGNOR TO DE FOREST RADIO TELEPHONE CO., A CORPORATION OF NEW YORK.

SPACE TELEGRAPHY.

No. 913,718.    Specification of Letters Patent.    Patented March 2, 1909.

Application filed June 25, 1907. Serial No. 380,655.

*To all whom it may concern:*

Be it known that I, LEE DE FOREST, a citizen of the United States, and a resident of New York, in the county of New York and State of New York, have invented a new and useful Improvement in Space Telegraphy, of which the following is a specification.

My invention relates to space telegraphy and more especially to transmitting systems employed in conjunction with receiving systems having elements which are electrically or mechanically attuned, such for example, as the receiving system described in the patent to Blondel No. 783,923, dated February 28, 1905.

In order to obtain the best results with a system having a circuit tuned electrically to spark frequency or with a receiving device such as a reed, monotelephone, Helmholtz resonator, etc., mechanically or acoustically attuned to spark frequency, it is necessary that the received impulses be of constant and uniform frequency and that they be undamaged, and in addition to these requirements it is most important that such impulses be simple harmonic in form, that is to say, that the intensity-time curve of the arriving impulses should be sinusoidal. While many attempts heretofore have been made to attune circuits electrically, or receiving devices mechanically, to the spark frequency of the waves to be received, so far as I am aware all said attempts have failed because, first, of the difficulty in maintaining a constant and uniform spark frequency at the transmitter and, second, because the impulses obtained at the receiving system in the local circuit thereof are not sinusoidal but are peaked and therefore multiperiodic in form.

It is the object of the present invention therefore to provide a space-telegraph transmitting system whereby trains of electromagnetic waves having a constant and uniform wave-train frequency, the trains of waves, varying according to a simple harmonic law, may be transmitted.

With this object in view my invention comprises a space telegraph tr nsmitting system energized by a source of high frequency electrical oscillations, preferably a source of continuous or practically continuous electrical oscillations, having a frequency higher than the limit of audibility, and suitable means for varying said oscillations according to a simple harmonic law at a relatively low rate—for example, a rate lower than the limit of audibility, said means being suitably associated with the system and, preferably, being located in the earth connector.

Several embodiments of my invention are illustrated diagrammatically in the drawings which accompany and form a part of this specification.

In the drawings, Figures 1, 2, 3 and 4 represent space telegraph transmitting systems constructed in accordance with my invention.

In the figures, G represents a source of electrical energy herein shown as a direct current generator.

R R are impedances or resistances.

C is a condenser.

M is an oscillation transformer.

V is a transmitting antenna.

E is an earth connection.

K is a key.

S is a discharger for the condenser C, being shown in the present instance as a gap between two arc electrodes.

In the systems illustrated in the present case the circuit S C M may be a source of practically continuous electrical oscillations when associated in the manner shown with the generator G. Suitably associated with the system, and as shown in the present instance, located in the earth connector of the antenna, I place a variable resistance properly connected with means for harmonically varying the same. It will be understood of course that in lieu of said resistance any other suitable device may be employed for harmonically varying the electromagnetic constants of the system.

In Fig. 1, the variable resistance is shown as a ring 2 which may be of graphite. 1 is a suitable motor herein shown as an electric motor, adapted to drive the brush 3 and cause the same to sweep around the graphite ring. Suitable means such as the brush *b* may be employed for connecting the brush 3 with the earth connection E.

Figure 3:
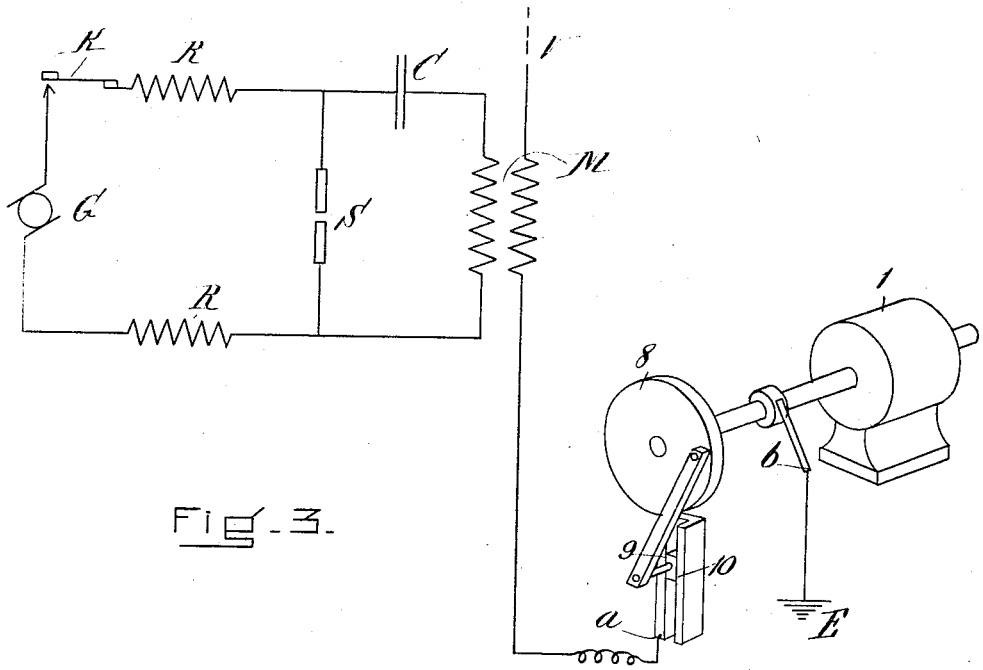

In Fig. 3, 10 represents a block which may be of graphite and 9 is a contact maker connected with the disk 8 in such manner as to cause it to oscillate backward and forward over the surface of the graphite block, its motion following a harmonic law.

Figure 2:
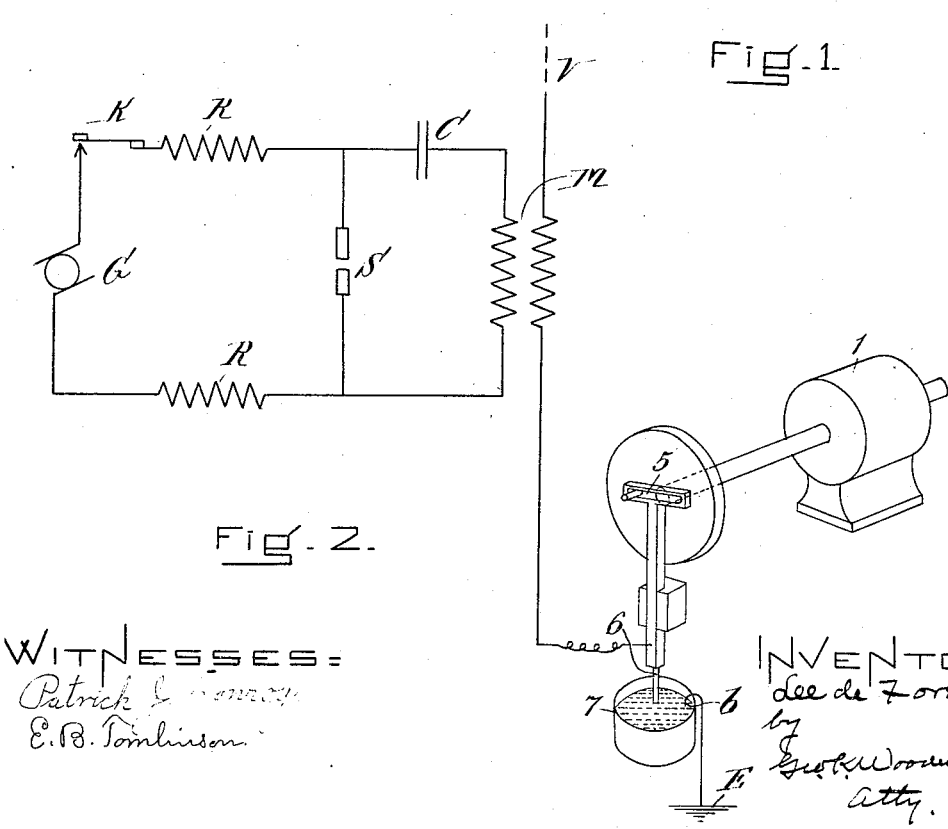

In Fig. 2, the contact maker 6 driven by the motor 1 and the slot-and-pin connection 5 may be periodically immersed in a conducting solution contained in the vessel 7.

Figure 4:
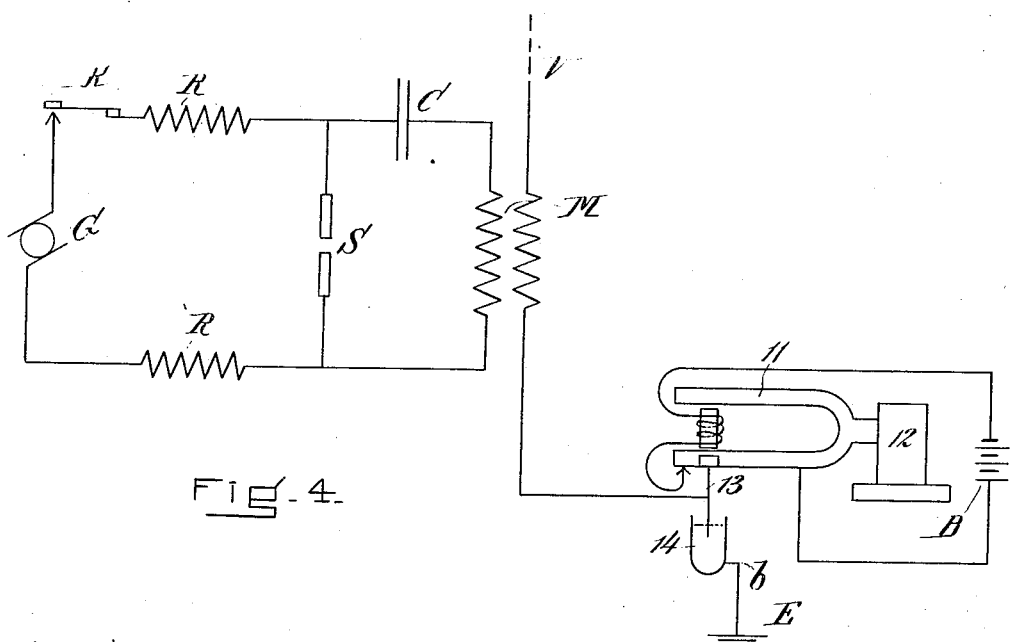

In Fig. 4, 11 represents an electrically actuated tuning fork caused to vibrate by the electromagnet 12 which is energized by the battery B or other suitable source of power. The contact maker 13, which is attached to said tuning fork, is periodically immersed in the conducting solution contained in the vessel 14.

It will be obvious that when the moving contact makers are nearest to the point $a$ in Figs. 1 and 3 and that when the contact makers in Figs. 2 and 4 are most deeply immersed in conducting solutions, the resistance of the antenna system V M E is a minimum, and that when the contact makers of Figs. 1 and 3 are farthest away from the points $a$ or those of Figs. 2 and 4 are either raised out of the conducting solutions or have a minimum immersion therein, the resistance of said antenna system will be a maximum. Accordingly there will be radiated electromagnetic waves of which the wave-trains vary from zero or from a minimum to a maximum and back again to said zero or minimum.

Each train of waves will consist of a large number of high frequency electromagnetic waves, preferaby continuous electromagnetic waves such as produced by the "singing-arc" circuit S C M. The wave train frequency of said electromagnetic wave will be constant and uniform and simple harmonic in character. This wave train frequency therefore is a secondary frequency of a lower order than the electrical frequency of said waves, and the variation of each train or group with respect to time will be practically simple harmonic, such amplitude following the law of motion of the contact makers with respect to their coöperating stationary resistances.

It will be understood of course that the means for harmonically varying one of the electromagnetic constants of the system, for instance the resistance of the system, may be associated with the system in a great variety of ways. I prefer as shown to connect said means in the earth connector at a point having practically zero potential to earth and to vary the resistance rather than the capacity or inductance because in this case the electrical frequency of the antenna system is not appreciably altered.

It will be obvious that many modifications may be made in the systems herein disclosed for the purpose of more fully illustrating my invention and therefore I desire it to be understood that I do not limit myself to the specific embodiments above set forth.

I claim:

1. In a space telegraph system, a source of practically continuous electrical oscillations of frequency higher than the limit of audibility, an elevated conductor associated with said source, and means for varying said oscillations according to a simple harmonic law at a rate lower than the limit of audibility.

2. In a space telegraph system, a source of practically continuous electrical oscillations having a relatively high rate of vibration, an elevated conductor associated with said source, and means for varying said oscillations in accordance with a simple harmonic law at a relatively lower rate.

3. In a space telegraph system, a source of practically continuous electrical oscillations of a frequency higher than the limit of audibility, an elevated conductor associated with said source, and means located in the earth connector of said elevated conductor for varying said oscillations in accordance with a simple harmonic law at a rate lower than the limit of audibility.

4. In a space telegraph system, a source of practically continuous electrical oscillations having a relatively high rate of vibration, an elevated conductor associated with said source, and means located in the earth connector of said elevated conductor for varying said oscillations in accordance with a simple harmonic law at a relatively lower rate.

5. In a space telegraph system, a source of practically continuous electrical oscillations having a relatively high rate of vibration, an elevated conductor associated with said source, and means for varying said oscillations in accordance with a simple harmonic law at a relatively lower rate, said means consisting of a variable resistance and means for harmonically varying the same.

6. In a space telegraph system, a source of practically continuous electrical oscillations having a relatively high electrical frequency and means for creating a relatively lower secondary frequency consisting of groups of waves, the variation of the amplitude of each group with respect to time being practically simple harmonic in character.

In testimony whereof, I have hereunto subscribed my name this 21st day of June 1907.

LEE DE FOREST.

Witnesses:
ROSCOE KENT,
THOMAS I. GALLAGHER.